United States Patent
Vasekin et al.

(10) Patent No.: US 11,403,105 B2
(45) Date of Patent: Aug. 2, 2022

(54) DETECTING MISPREDICTION WHEN AN ADDITIONAL BRANCH DIRECTION PREDICTION DETERMINED USING VALUE PREDICTION IS CONSIDERED MORE ACCURATE THAN AN INITIAL BRANCH DIRECTION PREDICTION

(71) Applicant: Arm Limited, Cambridge (GB)

(72) Inventors: Vladimir Vasekin, Cambridge (GB); David Michael Bull, Cambridge (GB); Frederic Claude Marie Piry, Cagnes sur Mur (FR); Alexei Fedorov, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/158,276

(22) Filed: Jan. 26, 2021

(65) Prior Publication Data

US 2021/0279063 A1    Sep. 9, 2021

(30) Foreign Application Priority Data

Mar. 5, 2020   (GB) .................................... 2003235

(51) Int. Cl.
*G06F 9/38* (2018.01)
(52) U.S. Cl.
CPC .......... *G06F 9/3848* (2013.01); *G06F 9/3832* (2013.01)
(58) Field of Classification Search
CPC .... G06F 9/3832; G06F 9/3844; G06F 9/3846; G06F 9/3848; G06F 9/3861
See application file for complete search history.

(56) References Cited

U.S. PATENT DOCUMENTS

| 6,516,409 B1 * | 2/2003 | Sato ........................ G06F 9/383 |
| | | 712/237 |
| 2004/0158697 A1 | 8/2004 | Col |

(Continued)

OTHER PUBLICATIONS

Aragón, Juan L., José Gonzalez, José M. Garcia, and Antonio González. "Confidence estimation for branch prediction reversal." In International Conference on High-Performance Computing, pp. 214-223. Springer, Berlin, Heidelberg, 2001. (Year: 2001).*

(Continued)

*Primary Examiner* — Keith E Vicary
(74) *Attorney, Agent, or Firm* — Nixon & Vanderhye P.C.

(57) ABSTRACT

An apparatus has processing circuitry for executing instructions and fetch circuitry for fetching the instructions for execution. When a branch instruction is encountered by the fetch circuitry, it determines subsequent instructions to be fetched in dependence on an initial branch direction prediction for the branch instruction made by branch prediction circuitry. Value prediction circuitry is used to maintain a predicted result value for one or more instructions, and dispatch circuitry maintains a record of pending instructions that have been fetched by the fetch circuitry and are awaiting execution by the processing circuitry, and selects pending instructions from the record for dispatch to the processing circuitry. When a given instruction whose predicted result value is maintained by the value prediction circuitry has a dependent instruction whose outcome is dependent on a result value of the given instruction, the dispatch circuitry nay be arranged to enable speculative execution of that dependent instruction using the predicted result value of the given instruction. Analysis circuitry is arranged, when the dependent instruction is the branch instruction, to detect a mispredict condition when an additional branch direction prediction for the branch instruction determined using the predicted result value for the given instruction is considered (Continued)

more accurate that the initial branch direction prediction, and the additional branch direction prediction differs to the initial branch direction prediction. On detection of the mispredict condition, a control signal is issued to indicate that the branch instruction has been mispredicted.

19 Claims, 9 Drawing Sheets

(56) References Cited

U.S. PATENT DOCUMENTS

| | | | |
|---|---|---|---|
| 2017/0286119 A1 | 10/2017 | Al Sheikh et al. | |
| 2018/0341492 A1* | 11/2018 | Sasai | G06F 9/3844 |
| 2020/0004551 A1 | 1/2020 | Vasekin et al. | |

OTHER PUBLICATIONS

Aragón, Juan L., José González, José M. García, and Antonio González. "Selective branch prediction reversal by correlating with data values and control flow." In Proceedings 2001 IEEE International Conference on Computer Design: VLSI in Computers and Processors. ICCD 2001, pp. 228-233. IEEE, 2001. (Year: 2001).*

Manne, Srilatha, Artur Klauser, and Dirk Grunwald. "Branch prediction using selective branch inversion." In 1999 International Conference on Parallel Architectures and Compilation Techniques (Cat. No. PR00425), pp. 48-56. IEEE, 1999. (Year: 1999).*

Gupta, Saurabh, Niranjan Soundararajan, Ragavendra Natarajan, and Sreenivas Subramoney. "Opportunistic early pipeline re-steering for data-dependent branches." In Proceedings of the ACM International Conference on Parallel Architectures and Compilation Techniques, pp. 305-316. 2020. (Year: 2020).*

Sazeides, Yiannakis, and James E. Smith. "Modeling program predictability." In Proceedings. 25th Annual International Symposium on Computer Architecture (Cat. No. 98CB36235), pp. 73-84. IEEE, 1998. (Year: 1998).*

González, José, and Antonio González. "Control-flow speculation through value prediction." IEEE Transactions on Computers 50, No. 12 (2001): 1362-1376. (Year: 2001).*

Heil, Timothy H., Zak Smith, and James E. Smith. "Improving branch predictors by correlating on data values." In MICRO-32. Proceedings of the 32nd Annual ACM/IEEE International Symposium on Microarchitecture, pp. 28-37. IEEE, 1999. (Year: 1999).*

Combined Search and Examination Report for GB2003235.5 dated Nov. 26, 2020, 9 pages.

* cited by examiner

VALUE PREDICTION STORAGE

| VALID FLAG (110) | PROGRAM COUNTER (115) | PREDICTED RESULT VALUE (120) | +/- INC (125) | RESULT VALUE CONFIDENCE (130) |
|---|---|---|---|---|
| | | | | |
| | | | | |
| ⋮ | ⋮ | ⋮ | ⋮ | ⋮ |
| | | | | |

155 (rows), 150

FIG. 4A

EXTRA STORAGE TO CAPTURE CONFIDENCE INFORMATION FOR DEPENDENT BRANCH INSTRUCTIONS

| INDEX TO ENTRY IN VP STORAGE (170) | BRANCH DIRECTION CONFIDENCE (CONFIDENCE IN BRANCH DIRECTION PREDICTED BASED ON PREDICTED RESULT VALUE IN INDEXED ENTRY) (175) |
|---|---|
| | |
| ⋮ | ⋮ |
| | |

165 (rows), 160

FIG. 4B

DETECTING MISPREDICTION WHEN AN ADDITIONAL BRANCH DIRECTION PREDICTION DETERMINED USING VALUE PREDICTION IS CONSIDERED MORE ACCURATE THAN AN INITIAL BRANCH DIRECTION PREDICTION

This application claims priority to GB Patent Application No. 2003235.5 filed Mar. 5, 2020, the entire contents of each of which are hereby incorporated by reference.

BACKGROUND

The present technique relates to an apparatus and method for performing branch prediction.

An apparatus may comprise processing circuitry for executing a sequence of instructions, and often the processing circuitry is arranged in a pipelined arrangement, so that at any point in time a number of instructions can be in the process of being executed within the various stages of the pipeline. The instructions to be executed by the processing circuitry may be fetched from memory by fetch circuitry and then passed through the pipeline for execution by the processing circuitry. Some of the instructions fetched may be branch instructions, and execution of such a branch instruction may cause a discontiguous change in program flow if the branch is taken, whereas if the branch is not taken the next instruction to be executed will be the instruction immediately following the branch instruction in the memory address space.

Typically the fetch circuitry operates ahead of the processing circuitry with the aim of providing the processing pipeline with a steady stream of instructions for execution by the processing circuitry. Branch prediction circuitry can be provided in association with the fetch circuitry to predict whether, for a fetched branch instruction, the branch will be taken or not taken when that branch instruction is subsequently executed by the processing circuitry, with that prediction then being used to determine the subsequent instructions fetched by the fetch circuitry.

It is desirable for the predictions made to be as accurate as possible, as when the prediction is incorrect it will in due course be necessary to flush the incorrectly fetched instructions from the pipeline, which can have a significant performance impact.

SUMMARY

In one example arrangement, there is provided an apparatus comprising: processing circuitry to execute instructions; fetch circuitry to fetch the instructions for execution by the processing circuitry, the fetch circuitry being arranged, when encountering a branch instruction, to determine subsequent instructions to be fetched in dependence on an initial branch direction prediction for the branch instruction made by branch prediction circuitry; value prediction circuitry to maintain a predicted result value for one or more instructions; dispatch circuitry to maintain a record of pending instructions that have been fetched by the fetch circuitry and are awaiting execution by the processing circuitry, and to select pending instructions from the record for dispatch to the processing circuitry; wherein when a given instruction whose predicted result value is maintained by the value prediction circuitry has a dependent instruction whose outcome is dependent on a result value of the given instruction, and the dependent instruction is in the record of pending instructions, the dispatch circuitry is arranged to enable speculative execution of the dependent instruction by the processing circuitry using the predicted result value of the given instruction; and analysis circuitry arranged, when the dependent instruction is the branch instruction, to detect a mispredict condition when an additional branch direction prediction for the branch instruction determined using the predicted result value for the given instruction is considered more accurate than the initial branch direction prediction, and the additional branch direction prediction differs to the initial branch direction prediction, and on detection of the mispredict condition to issue a control signal to indicate that the branch instruction has been mispredicted.

In another example arrangement, there is provided a method of performing branch prediction comprising: employing processing circuitry to execute instructions; fetching the instructions for execution by the processing circuitry, and when encountering a branch instruction during the fetching, determining subsequent instructions to be fetched in dependence on an initial branch direction prediction for the branch instruction made by branch prediction circuitry; employing value prediction circuitry to maintain a predicted result value for one or more instructions; maintaining a record of pending instructions that have been fetched and are awaiting execution by the processing circuitry, and selecting pending instructions from the record for dispatch to the processing circuitry; when a given instruction whose predicted result value is maintained by the value prediction circuitry has a dependent instruction whose outcome is dependent on a result value of the given instruction, and the dependent instruction is in the record of pending instructions, enabling speculative execution of the dependent instruction by the processing circuitry using the predicted result value of the given instruction; when the dependent instruction is the branch instruction, detecting a mispredict condition when an additional branch direction prediction for the branch instruction determined using the predicted result value for the given instruction is considered more accurate than the initial branch direction prediction, and the additional branch direction prediction differs to the initial branch direction prediction; and on detection of the mispredict condition, issuing a control signal to indicate that the branch instruction has been mispredicted.

In a still further example arrangement, there is provided an apparatus comprising: processing means for executing instructions; fetch means for fetching the instructions for execution by the processing means, the fetch means, when encountering a branch instruction, for determining subsequent instructions to be fetched in dependence on an initial branch direction prediction for the branch instruction made by branch prediction means; value prediction means for maintaining a predicted result value for one or more instructions; dispatch means for maintaining a record of pending instructions that have been fetched by the fetch means and are awaiting execution by the processing means, and for selecting pending instructions from the record for dispatch to the processing circuitry; wherein when a given instruction whose predicted result value is maintained by the value prediction means has a dependent instruction whose outcome is dependent on a result value of the given instruction, and the dependent instruction is in the record of pending instructions, the dispatch means is arranged to enable speculative execution of the dependent instruction by the processing means using the predicted result value of the given instruction; and analysis means for detecting, when the dependent instruction is the branch instruction, a mispredict condition when an additional branch direction prediction for the branch instruction determined using the predicted result value for the given instruction is considered more accurate than the initial branch direction prediction, and the additional branch direction prediction differs to the initial branch direction prediction, and on detection of the mispredict condition for issuing a control signal to indicate that the branch instruction has been mispredicted.

BRIEF DESCRIPTION OF THE DRAWINGS

The present technique will be described further, by way of illustration only, with reference to examples thereof as illustrated in the accompanying drawings, in which:

FIGS. 4A and 4B illustrate the fields provided within entries of a value prediction storage, and an associated extra storage, in accordance with an alternative example implementation;

DESCRIPTION OF EXAMPLES

Figure 1:
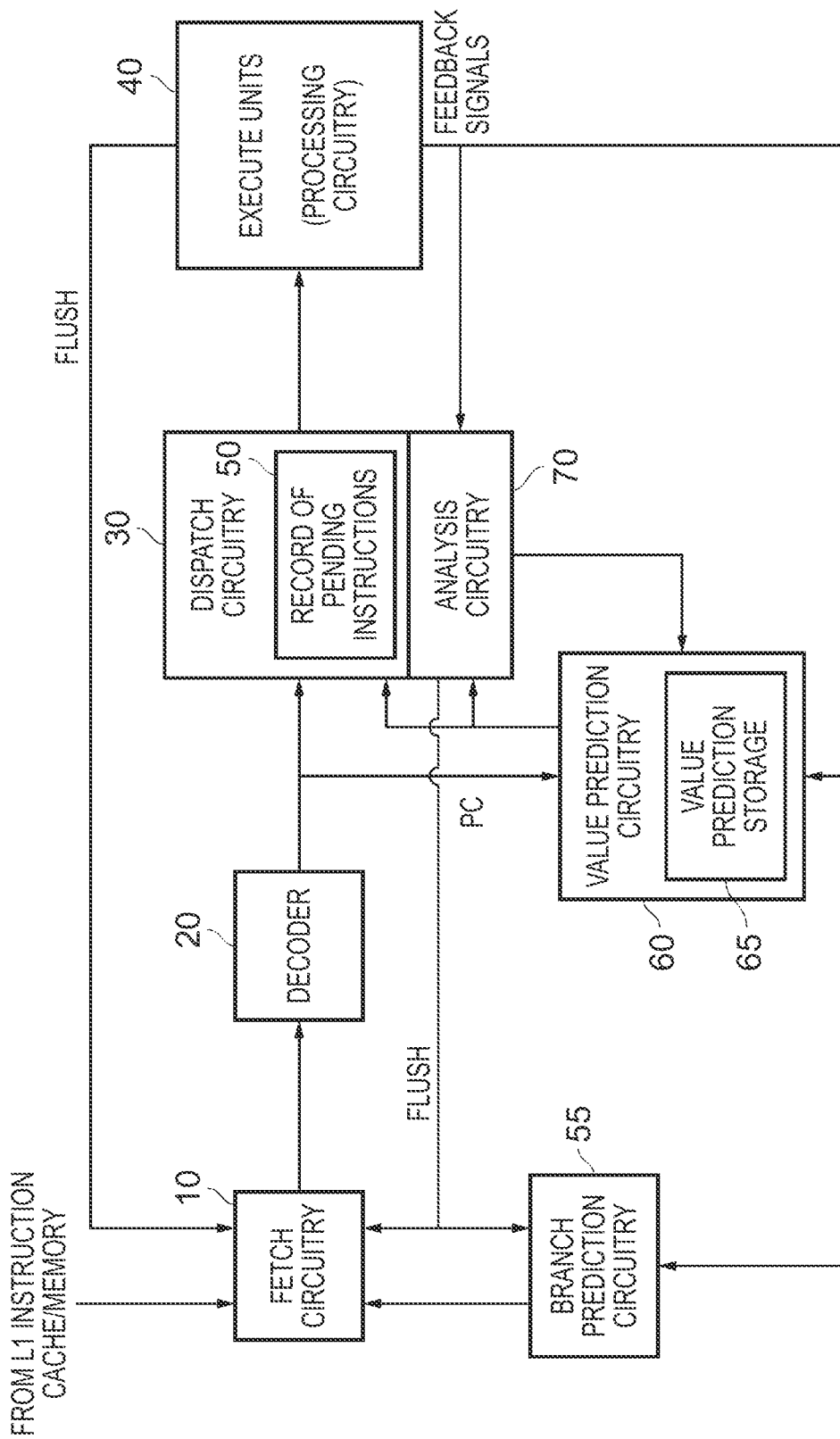
FIG. 1 is a block diagram of an apparatus in accordance with one example implementation.

In accordance with one example implementation, an apparatus is provided that has processing circuitry for executing instructions, and fetch circuitry for fetching the instructions for execution by the processing circuitry. The instructions will typically be fetched from a memory system, and the memory system may comprise various levels of a memory hierarchy, including a number of levels of cache and main memory.

The fetch circuitry may be arranged such that when a branch instruction is encountered in the instructions fetched from memory, the fetch circuitry then determines subsequent instructions to be fetched in dependence on an initial branch direction prediction (identifying whether the branch is predicted to be taken or not taken) for the branch instruction made by branch prediction circuitry. When the fetched branch instruction is subsequently executed by the processing circuitry, the actual branch outcome of the branch instruction will be determined, and in situations where the actual branch outcome differs form the initial branch direction prediction made by the branch prediction circuitry, then this can have a significant performance impact, as it will typically be necessary to flush from the apparatus all of the fetched instructions subsequent to the branch instruction. Accordingly, it would be desirable to predict earlier a situation where the branch direction prediction made by the branch prediction circuitry is likely to be wrong, so that steps can be taken to fetch instructions that would be required had the opposite branch direction prediction been made by the branch prediction circuitry, without needing to wait until the subsequent execution of the branch instruction by the processing circuitry actually determines that the initial branch direction prediction was wrong.

As will be discussed in more detail herein, the techniques described herein enable such a mechanism to be provided, through use of predicted result values maintained by value prediction circuitry for certain instructions. Traditionally, such value prediction circuitry is provided for purposes entirely separate to the handling of branch instructions. In particular, it is often the case that some instructions are dependent on the result of an earlier instruction, for example because they require as one of their source operands the result produced by that earlier instruction. To seek to improve performance in such situations, it is known to provide value prediction circuitry that can maintain a predicted result value for one or more instructions, and typically the instructions chosen for this purpose are long latency instructions such as load instructions that miss in at least an initial level of cache. If a predicted result value is available for a given instruction, then this would allow the processing circuitry to speculatively execute one or more dependent instructions (i.e. instructions whose outcome is dependent on the result value of the given instruction), based on use of the predicted result value. Later, it can then be verified whether the predicted result value did in fact match the actual result value produced when the given instruction was executed. If the prediction is correct, then the speculative execution will have produced a significant performance improvement by avoiding the need to wait for the actual result value to be produced. Conversely, if the prediction is wrong, then the processing circuitry will need to re-execute the dependent instructions.

In accordance with the techniques described herein, it has been realised that the value prediction circuitry can also be utilised to detect situations where the initial branch direction prediction made by the branch prediction circuitry appears to be inaccurate, in particular in situations where one of the dependent instructions of the given instruction is a branch instruction.

In accordance with the techniques described herein, the apparatus has the earlier mentioned value prediction circuitry, and has dispatch circuitry for maintaining a record of pending instructions that have been fetched by the fetch circuitry and are awaiting execution by the processing circuitry. The dispatch circuitry selects pending instructions from the record for dispatch to the processing circuitry. When a given instruction whose predicted result value is maintained by the value prediction circuitry has a dependent instruction whose outcome is dependent on a result value of the given instruction, and the dependent instruction is in the record of pending instructions, then the dispatch circuitry can be arranged to enable speculative execution of the dependent instruction by the processing circuitry using the predicted result value of the given instruction.

In addition, in accordance with the techniques described herein, analysis circuitry is provided that, in situations where the dependent instruction is a branch instruction, is arranged to detect a mispredict condition when an additional branch direction prediction for the branch instruction determined using the predicted result value for the given instruction is considered more accurate than the initial branch direction prediction, and the additional branch direction differs to the initial branch direction prediction. On detection of the mispredict condition, the analysis circuitry is then arranged to issue a control signal to indicate that the branch instruction has been mispredicted. Such a control signal can be issued significantly earlier than would be the case had the accuracy of the initial branch direction prediction only been checked when the branch instruction is actually executed by the processing circuitry. In particular, even before such a branch instruction is dispatched, the analysis circuitry can detect situations where the additional branch direction prediction determined using the predicted result value for the given instruction is different to the initial branch direction prediction, and is considered more accurate that the initial branch direction prediction, and hence can provide a significantly earlier notification to the fetch circuitry of the misprediction, reducing the number of instructions that need to be flushed from the pipeline, and hence improving performance.

In one example implementation, in response to the control signal, the instructions that have been fetched by the fetch circuitry based on the initial branch direction prediction are flushed from the apparatus and the fetch circuitry is arranged to begin fetching subsequent instructions based on the additional branch direction prediction. However, as noted above, since the control signal can be generated much earlier than would be the case had the misprediction only been detected when the branch instruction is subsequently executed, the amount of instructions that need to be flushed can be significantly reduced. Further, in some instances the latency involved in this flushing activity can be hidden from the processing circuitry, and it may be the case that the processing circuitry does not in fact need to stall at all, and can continue to execute instructions provided by the dispatch circuitry. In particular, by the time it does execute the branch instruction, the early detection of the misprediction by the analysis circuitry may have resulted in the required instructions being fetched, and accordingly if the additional branch direction prediction turns out to be correct the required instructions will have already have been fetched, and the processing circuitry can continue to execute them without interruption.

There are a number of ways in which the analysis circuitry can be arranged to determine situations where the additional branch direction prediction is considered more accurate from the initial branch direction prediction. In one example implementation, the analysis circuitry is arranged, in response to a trigger condition, to maintain, in association with an entry in the value prediction storage used to maintain a predicted result value for the given instruction, a branch direction confidence indicating a confidence in the additional branch direction prediction. The analysis circuitry can then be arranged to monitor an outcome of execution of the branch instruction by the processing circuitry and update the branch direction confidence dependent on that outcome. Hence, through reference to the maintained branch direction confidence, the analysis circuitry is in a position to determine whether the additional branch direction prediction is considered more accurate than the initial branch direction prediction.

There are a number of ways in which the branch direction confidence can be updated. In one example implementation, when the outcome of execution of the branch instruction indicates a branch direction that matches the additional branch direction prediction, the analysis circuitry is arranged to adjust the branch direction confidence to indicate an increased confidence. Similarly, when the outcome of execution of the branch instruction indicates a branch direction that differs from the additional branch direction prediction, the analysis circuitry is arranged to adjust the branch direction confidence to indicate a decreased confidence.

In one example implementation, the analysis circuitry is arranged to monitor the outcome of execution of the branch instruction for multiple instances of execution of the branch instruction, and to update the branch direction confidence dependent on each outcome. Hence, on an ongoing basis the analysis circuitry can maintain the branch direction confidence taking into account the actual outcome of execution of multiple instances of the branch instruction in question.

In one example implementation, the analysis circuitry is arranged, for a current instance of execution of the branch instruction, to detect the mispredict condition when the additional branch direction prediction differs to the initial branch direction prediction and the branch direction confidence exceeds a branch direction confidence threshold value. Hence, the fact that the branch direction confidence has exceeded a branch direction confidence threshold value can be used as an indication that the additional branch direction prediction is considered more accurate than the initial branch direction prediction.

A number of factors can be used in order to determine whether the trigger condition is present. For instance, in one example implementation presence of the trigger condition requires at least detection that the additional branch direction prediction differs from the initial branch direction prediction. Hence, until such a situation has arisen, then in such an implementation a branch direction confidence will not be maintained in association with the branch instruction.

In one example implementation, the apparatus may begin to start maintaining the branch direction confidence as soon as an occurrence of the additional branch direction prediction being different from the initial branch direction prediction occurs. Alternatively, the apparatus may be arranged so that presence of the trigger condition further requires a confidence in the predicted result value to exceed a result value confidence threshold value. In particular, it may be considered appropriate to wait until such time as there is a required degree of confidence in the predicted result value before making use of the fact that the additional branch direction prediction differs from the initial branch direction prediction as a trigger to start maintaining a branch direction confidence indicating a confidence in the additional branch direction prediction.

However, in an alternative implementation there may be considered no requirement for the above factors to be identified before the trigger condition is determined to be present. Instead, for example, the trigger condition may be determined to be present when the branch instruction is detected as a pending instruction in the record, and the value prediction circuitry has an entry for the given instruction. Hence, the mere fact that the value prediction circuitry is seeking to maintain a predicted result value for the given instruction, and that the branch instruction is a pending instruction dependent on that given instruction, may itself be sufficient for the trigger condition to be determined, and accordingly for the analysis circuitry to start maintaining a branch direction confidence.

There are a number of ways in which the branch direction confidence can be maintained. In one example implementation, the branch direction confidence is maintained within the field of the entry in the value prediction storage that is used to maintain the predicted result value for the given instruction. Hence, one or more additional fields can be provided in association with each entry in the value prediction storage to enable such additional information to be maintained.

However, in an alternative implementation the branch direction confidence may be maintained within an additional storage structure separate to a storage structure within the value prediction circuitry used to maintain the predicted result value for the given instruction. An entry in the additional storage structure may then be used to maintain the branch direction confidence, and can be arranged to include an indication of the entry in the value prediction storage used to maintain the predicted result value for the given instruction. In some implementations, this may enable a more efficient utilisation of available storage capacity by avoiding the need to provide each entry in the value prediction storage with additional fields.

The analysis circuitry can be provided at a variety of locations within the apparatus, but in one example is provided in association with the dispatch circuitry. The dispatch circuitry is arranged to receive the predicted result values from the value prediction circuitry, and accordingly by providing the analysis circuitry in association with the dispatch circuitry, this enables the information already being provided to the dispatch circuitry to be received by the analysis circuitry.

The control signal that is generated by the analysis circuitry to indicate that the branch instruction is considered to have been mispredicted may in one example implementation merely be provided to the fetch circuitry to cause the earlier discussed flush operation to be performed, with the fetch circuitry then fetching the instructions appropriate for the opposite branch direction to that predicted by the branch prediction circuitry. However, if desired, the control signal may also be provided to the branch prediction circuitry to enable adjustment of the information used by the branch prediction circuitry to make the initial branch direction prediction for subsequent instances of the branch instruction. Hence, the mispredictions detected by the analysis circuitry can in fact be used to improve the accuracy of the branch prediction circuitry itself.

As discussed earlier, in one example implementation the mispredict condition can be detected when the additional branch direction prediction is considered more accurate than the initial branch direction prediction, and the additional branch direction prediction differs to the initial branch direction prediction. In one example implementation, detection of the mispredict condition may further require a confidence in the predicted result value to exceed a result value confidence threshold value. Hence, in situations where confidence in the predicted result value itself is not at a sufficiently high level, then it may be decided not to generate the mispredict condition, and instead to rely on the initial branch direction prediction made by the branch prediction circuitry.

As discussed earlier, the analysis circuitry can be arranged to monitor the outcome of execution of the branch instruction in order to detect situations where the branch direction matches, or differs to, the additional branch direction prediction, with the branch direction confidence being adjusted accordingly. If desired, this information can also be used to adjust the confidence in the predicted result value. Hence, for example, the analysis circuitry may be arranged to adjust a confidence in the predicted result value to indicate an increased confidence in the predicted result value in situations where the outcome of the execution of the branch instruction indicates a branch direction that matches the additional branch direction prediction. Conversely, when the outcome of execution of the branch instruction indicates a branch direction that differs from the additional branch direction prediction, the analysis circuitry may be arranged to also adjust the confidence in the predicted result value to indicate a decreased confidence in the predicted result value. By such a mechanism, it can be seen that in situations where the initial branch direction prediction made by the branch prediction circuitry becomes consistently more accurate than the additional branch direction prediction, this can be used to reduce the confidence in the predicted result value, which may ultimately cause the entry for the predicted result value to be flushed from the value prediction circuitry, and for the value prediction circuitry to then seek to predict the result value based on the branch prediction made by the branch prediction circuitry.

Particular examples will now be described with reference to the Figures.

FIG. 1 is a block diagram of an apparatus in accordance with one example implementation. A processor pipeline is shown comprising a number of components used to handle the execution of instructions. In particular, fetch circuitry 10 is provided for fetching instructions from a memory system for execution within the processor pipeline. The memory system may include one or more levels of cache. Branch prediction circuitry 55 may be provided in association with the fetch circuitry for use in predicting the outcome of branch instructions amongst the instructions fetched by the fetch circuitry 10, and hence influence which instructions are fetched subsequent to each branch instruction. For example, the branch prediction circuitry 55 may be used to predict a branch direction for a branch instruction, i.e. whether a fetched branch instruction will result in a taken branch or a not taken branch when that branch instruction is subsequently executed. This information can then be used to control which instructions are subsequently fetched by the fetch circuitry 10.

The fetched instructions are then passed to a decoder 20 which decodes the instructions in order to produce control information used to control the execution of those instructions within an appropriate one of the execute units 40. The execute units 40 can be considered to form processing circuitry used to execute the instructions, and often the processing circuitry itself may consist of a number of pipelined stages, such that a number of instructions can be in the process of being executed within the various stages of the pipeline of the processing circuitry 40.

As shown, dispatch circuitry 30, which may also be referred to as issue circuitry, is provided for maintaining a record 50 of the pending instructions that are awaiting execution by the execute units 40. Hence, for each of the instructions decoded by the decoder 20, an entry may be maintained within the record 50 to identify information relating to that instruction. This information may identify for example the type of operation that is required to be performed, and an indication of the execute unit to which that instruction should be forwarded for execution, and will also maintain information about the source and destination operands for the instruction. Whilst in some instances one or more source operands may be specified as immediate values, it is often the case that the source operand values are specified with reference to a register within a register file accessible to the processor pipeline, that register file being omitted for simplicity in FIG. 1. The destination operand may also be specified by identifying a register to which the result value is to be written.

Once the source operands for a particular pending instruction are available, and assuming any other constraints on issuance of the instruction are met, then the dispatch circuitry 30 may select that instruction for forwarding to the appropriate execute unit of the processing circuitry 40, to cause that instruction to be executed.

It is often the case that some instructions are dependent on the result of an earlier instruction, for example because they require as one of their source operands the result produced by that earlier instruction. Hence, this may require a pending instruction within the record 50 that is dependent on the result to be produced by another instruction that has not yet completed execution within the processing circuitry 40, to have to await the result value of that earlier instruction to become available before it can then be selected by the dispatch circuitry for forwarding to the processing circuitry for execution. Where the earlier instruction is a long latency instruction, for example a load instruction where a miss occurs within at least a first level of cache, then there may be a significant number of clock cycles before the result value becomes available for the long latency instruction, which can incur a significant delay in the processing of the pending instruction, since it cannot be issued from the dispatch circuitry until the result value for the long latency instruction is available.

In order to seek to improve performance in such situations, value prediction storage 65 may be provided for maintaining a predicted result value for instructions such as long latency instructions. The content of the value prediction storage 65 may be managed by value prediction circuitry 60. The value prediction circuitry may hence, for example, monitor the instructions being executed within the processing pipeline, and when a long latency instruction is observed, can then await the actual result value being produced by the processing circuitry (which can be provided as a feedback signal to the value prediction circuitry), and at that point can allocate an entry into the value prediction storage to maintain information about that instruction, and the result value obtained when executing that instruction, so that that result value can in due course form a predicted result value for later occurrences of that instruction within the instruction sequence being executed by the processor pipeline. As will be discussed in more detail below, certain checking mechanisms may be implemented in relation to one or more future occurrences of the instruction to seek to determine an indication of the accuracy of the predicted result value before it is decided to begin using the predicted result value to influence the decisions taken by the dispatch circuitry 30 as to when instructions can be issued to the execute units 40 for execution.

As each decoded instruction is output from the decoder 20, the program counter value for that instruction can be forwarded to the value prediction circuitry 60, to cause a lookup to be performed within the entries of the value prediction storage 65 to determine whether the associated instruction has an entry within the value prediction storage. If it does, and provided any confidence requirement in relation to the predicted result value is met, then the predicted result value may be forwarded from the value prediction circuitry 60 to the dispatch circuitry 30, where it can be used in association with the record of pending instructions 50. In one example implementation, a buffer can be provided in association with the dispatch circuitry to store such a forwarded predicted result value for subsequent use in association with dependent instructions. In particular, as the record of pending instructions is populated with one or more dependent instructions that require as a source operand the result value of the instruction that resulted in a hit in the value prediction storage, then the predicted result value can be used as that source operand rather than waiting for the actual result value to be produced. This means that for a dependent instruction that would otherwise be kept back in the record awaiting the actual result value, it can instead be dispatched earlier by the dispatch circuitry 30 for speculative execution within the execute units 40, using as the relevant source operand the predicted result value provided from the value prediction storage 65.

By allowing an earlier dispatch of such dependent instructions to the execute units 40, using as a source operand a predicted result value obtained from the value prediction storage 65, this can allow a significant increase in throughput of execution of instructions, provided that the predicted result value is accurate most of the time. In due course, since the dependent instructions will have been speculatively executed, a check needs to be made that the result value for the instruction that gave rise to the hit in the value prediction storage does actually match the predicted result value that was forwarded to the dispatch circuitry, and if it does not it is necessary to invoke a replay mechanism to restore the state of the processor pipeline to the state it was in prior to the speculative execution of the dependent instructions, so that the dependent instructions can be re-executed using the actual result value.

It will be appreciated that the components illustrated within the processor pipeline are schematic, and there will be typically be a number of other components provided within the processor pipeline, for example rename circuitry used to map architectural registers to physical registers of the register file, in situations where register renaming is used to facilitate out-of-order execution of instructions, etc.

As discussed earlier, performance can be significantly impacted when the branch direction prediction made by the branch prediction circuitry 55 is inaccurate, since in that event the fetch circuitry will not be fetching the correct instructions required by the execute units 40. When the branch instruction is subsequently executed by the execute units, and hence the actual branch direction is detected, then if this differs to the prediction made by the branch prediction circuitry (that prediction information being passed through the pipeline in association with the instruction so that the execute units 40 can determine situations where the actual branch direction outcome differs to the predicted branch direction outcome), then a flush signal need to be returned from the execute units to the fetch circuitry to cause all of the instructions subsequent to the branch instruction to be flushed from the pipeline, and for the fetch circuitry to then begin fetching instructions taking into account the actual branch direction outcome.

Feedback signals can be passed from the execute units 40 to the branch prediction circuitry 55 to enable the branch prediction circuitry to update the information stored therein in order to make branch predictions, with the aim of improving the accuracy of the branch prediction circuitry 55. Nevertheless, there will be situations where the branch prediction circuitry does not correctly predict the branch direction, and from the above discussion it will be appreciated that a significant performance impact results in such situations.

As will be discussed in more detail herein, in accordance with the techniques described herein situations are detected where a branch instruction is actually a dependent instruction for a given instruction whose predicted result value is stored in the value prediction storage 65, and analysis circuitry 70 is provided to detect situations where a more accurate branch direction prediction can be made using the predicted result value for the given instruction, rather than relying on the branch direction prediction made by the branch prediction circuitry 55. This can enable a much earlier detection of a branch direction misprediction, allowing the analysis circuitry 70 to issue a flush signal to the fetch circuitry 10 without needing to wait for the fetched branch instruction to actually be executed by the execute units 40. Such flush signal information generated by the analysis circuitry 70 can also be provided to the branch prediction circuitry 55 to enable branch prediction circuitry to update the information stored therein used to make future branch predictions, with the aim of increasing the accuracy of the branch prediction circuitry 55.

As will be discussed in more detail herein, a situation can be detected where a branch instruction in the record of pending instructions 50 is a dependent instruction that is dependent on a given instruction for which an entry is being maintained in the value prediction storage 65. Then, in response to a trigger condition the analysis circuitry 70 can be arranged to maintain, in association with the entry in the value prediction storage used to maintain the predicted result value for the given instruction, a branch direction confidence indicating a confidence in a branch direction prediction made for the dependent branch instruction using the predicted result value of the given instruction. Such a branch direction prediction will be referred to herein as an additional branch direction prediction, as distinguished from the initial branch direction prediction made by the branch prediction circuitry 55.

Feedback signals from the execute unit 40 provided each time the dependent branch instruction is executed can be reviewed by the analysis circuitry 70 to determine whether the additional branch direction prediction or the initial branch direction prediction made the correct prediction. In situations where the additional branch direction prediction made the correct prediction of the branch direction, then the earlier-mentioned branch direction confidence can be incremented. Subsequently, once the branch direction confidence has reached a threshold level, and in situations where the analysis circuitry detects that the additional branch direction prediction differs to the initial branch direction prediction, then the analysis circuitry 70 can issue a flush signal to the fetch circuitry 10 to cause the fetch circuitry to flush instructions following the branch instruction, and begin fetching instructions assuming the opposite direction prediction to that made by the branch prediction circuitry 55. As mentioned earlier, this can occur well ahead of the time that the branch instruction will actually be executed by the execute unit 40, and hence significantly reduce the performance impact of requiring the flush. Indeed, in some situation, the performance impact of the flush can be entirely hidden from the execute units, since there may be sufficient instructions in the dispatch circuitry 30 to enable execute unit 40 to be kept busy whilst the required instructions are being fetched following the flush signal from the analysis circuitry 70.

Figure 2:
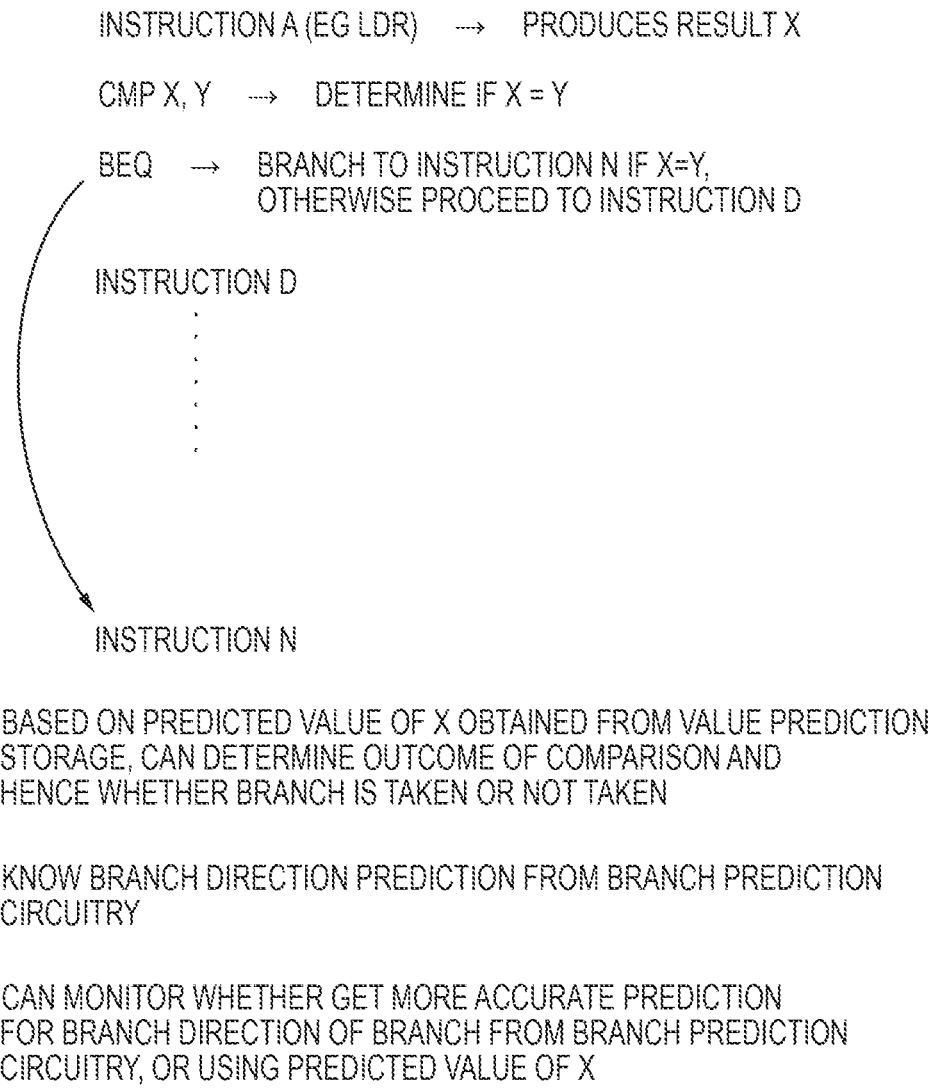
FIG. 2 is a diagram schematically illustrating how a predicted result value for a given instruction can be used to predict the branch direction behaviour of a dependent branch instruction, in accordance with one example implementation.

FIG. 2 schematically illustrates how a predicted result value for a given instruction can be used to predict the branch direction behaviour of a dependent branch instruction, in accordance with one example arrangement. The given instruction in this example is referred to as instruction A, and may for example be a long latency instruction such as a load instruction. Execution of this instruction results in the production of a result value X. The next instruction is a compare instruction that compares the value X against the value Y in order to determine whether X is equal to Y. The subsequent instruction is a branch instruction whose branch behaviour is dependent on the result of the comparison instruction. In particular, if the comparison operation performed by the comparison instruction determines that X does equal Y then the branch is taken, resulting in a branch to instruction N shown in FIG. 2. However, otherwise, the branch is not taken, and the next sequential instruction in the memory address space, referred to in FIG. 2 as instruction D, is executed.

In this example, it can be seen that the branch instruction is a dependent instruction in respect of instruction A, since whether the branch is taken or not taken will depend on the result value X. Hence, if instruction A is being tracked in the value prediction storage 65, and in particular if there is a predicted result value for that instruction, then based on the predicted result value it can be determined whether the result of the comparison will be that the result value matches the value Y or not, and hence it can be determined whether the branch will be taken or not taken. The analysis circuitry 70 can perform this analysis using the predicted result value for the instruction A provided by the value prediction storage 65. This prediction made in respect of the branch instruction is the additional branch direction prediction referred to earlier.

In addition, when the branch instruction is passed from the fetch circuitry 10 through the decoder 20 and into the dispatch circuitry 30, the initial branch direction prediction information is passed through the pipeline in association with that instruction, and accordingly the analysis circuitry 70 can determine whether the additional branch direction prediction differs from the initial branch direction prediction. Further, based on the feedback signals from the execute units 40 for multiple instances of execution of the branch instruction, the analysis circuitry 70 can monitor whether a more accurate branch direction prediction is made using the additional branch direction prediction or the initial branch direction prediction. As will be discussed in more detail herein, information maintained either directly within the value prediction storage, or within an additional storage associated therewith, can be used to maintain a confidence indication in the additional branch direction prediction. When that confidence reaches a certain threshold level, then in instances where the additional branch direction prediction differs to the initial branch direction prediction, the analysis circuitry 70 can assert the earlier-discussed flush signal, in order to cause an early flush of the instructions that have been fetched by the fetch circuitry 10 based on the initial branch direction prediction made by the branch prediction circuitry 55, and instead the fetch circuitry will then fetch instructions assuming the opposite branch direction to that indicated by the initial branch direction prediction.

Figure 3:
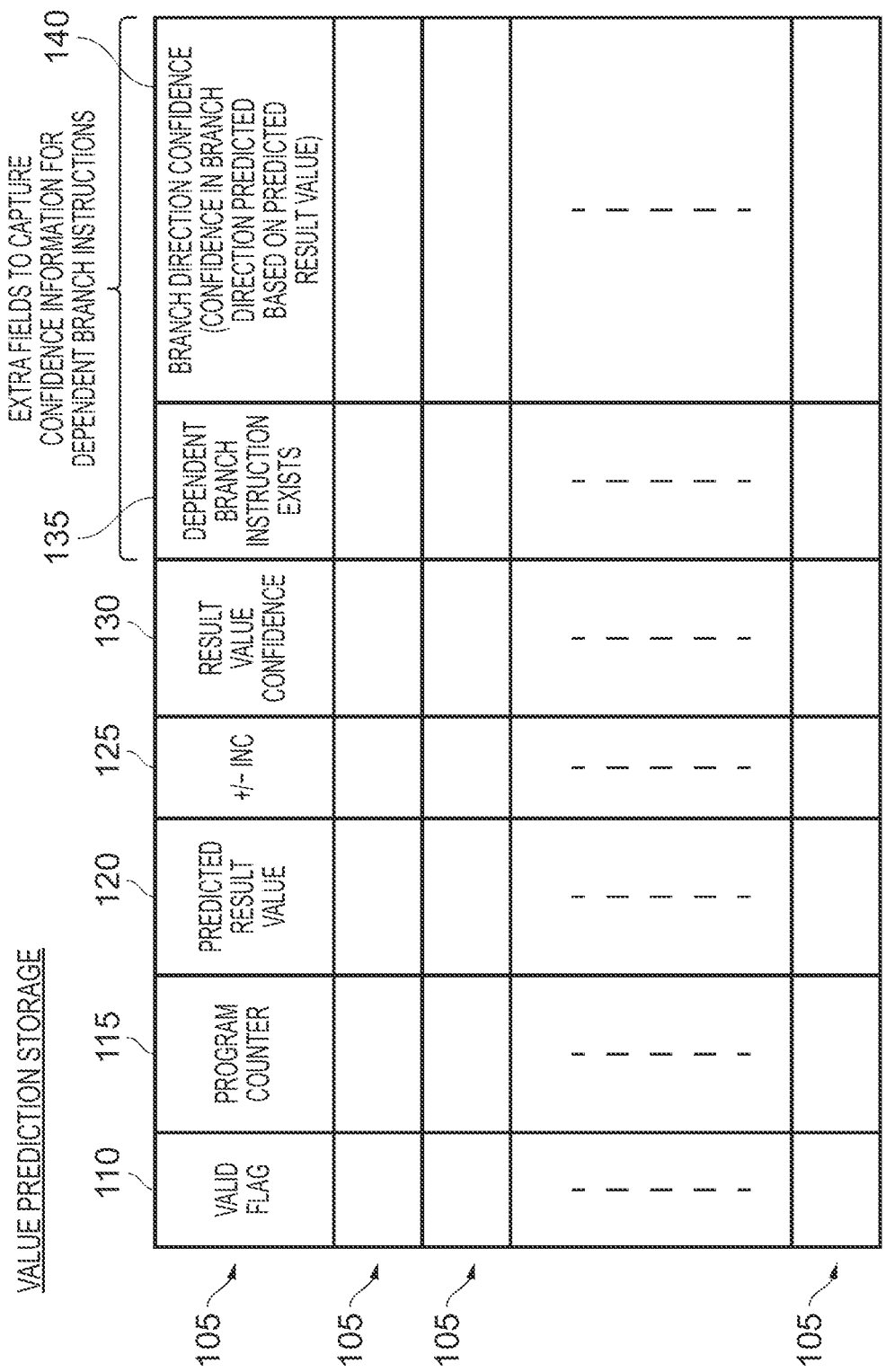
FIG. 3 is a diagram illustrating the various fields that may be provided within each entry of the value prediction storage of FIG. 1 in accordance with one example implementation.

FIG. 3 is a diagram illustrating fields that may be provided within each entry 105 of the value prediction storage 65 in one example implementation. A valid flag 110 is used to indicate whether a particular entry is currently considered to store valid information or not, and when the value prediction circuitry 60 performs a lookup within the value prediction storage, it will only be able to obtain a hit in respect of an entry that is marked as valid.

Field 115 is provided for storing a program counter value identifying the instruction to which the entry relates, and the value prediction circuitry 60 compares the program counter information 115 within each entry with the program counter forwarded from the decoder 20 in order to determine whether an entry exists for the decoded instruction.

A field 120 provides a predicted result value for the instruction, whilst a field 125 can provide adjustment information, for example a positive or negative increment amount, that can be used to adjust the predicted result value following each occurrence of the instruction.

Field 130 maintains a confidence indication indicative of the confidence as to the accuracy of the predicted result value in the field 120, and when the confidence indication reaches a predetermined threshold level, this is used to identify that the predicted result value can now be used. Accordingly when a hit occurs within an entry whose confidence indication indicates that the accuracy has reached that threshold level, then the predicted result value in the field 120 can be output to the dispatch circuitry 30.

The above fields are standard fields that may be provided within a value prediction storage. However, as shown in FIG. 3, a number of additional fields can also be provided in association with each entry 105, to capture confidence information for a dependent branch instruction. In situations where there are multiple dependent branch instructions within the record 50 for a particular given instruction that has an entry 105 in the value prediction storage, then in one example implementation the additional fields 135, 140 are used in order to track a branch direction confidence for the first occurring branch instruction.

As shown in FIG. 3, a field 135 can be used to flag whether there is a dependent branch instruction for the given instruction identified by the program counter value in the field 115 of a particular entry 105. In situations where the field 135 is set to identify that there is a dependent branch instruction, then the field 140 can be used to capture a branch direction confidence value, this being a confidence in the branch direction predicted based on the predicted result value stored in the field 120 for the given instruction. Hence, purely by way of example, with reference to the earlier discussed FIG. 2, one of the entries 105 may be used to track the predicted result value for the instruction A. The field 135 for that entry can be set to identify that there is a dependent branch instruction, i.e. the BEQ instruction shown in FIG. 2. Further, the field 140 can be used to maintain a branch direction confidence in respect of the BEQ branch instruction. In particular, on occurrence of a trigger condition, the analysis circuitry 70 can be used to start maintaining the branch direction confidence information in the field 140, with this being updated dependent on the outcome of each subsequent occurrence of the dependent branch instruction, based on feedback signals received from the execute units 40. The allocation and maintenance of the branch direction confidence information will be discussed in more detail later.

In the example shown in FIG. 3, each entry 105 in the value prediction storage 100 is supplemented with the additional fields 135, 140. However, FIGS. 4A and 4B illustrate an alternative implementation where the value prediction storage does not include such additional fields, and instead an extra storage is provided. Hence, the value prediction storage 150 takes the forms shown in FIG. 4A, and each entry 155 included the fields 110, 115, 120, 125, 130 discussed earlier. Hence, the value prediction storage can take a standard form.

The additional storage 160 includes two fields 170, 175 in association with each entry 165 in that extra storage 160. The field 170 is used to provide an index to an entry in the value prediction storage, hence identifying which entry in the value prediction storage the entry 165 in the additional storage 160 is associated with. If desired, a valid bit can be provided for each entry to identify whether the contents of that entry 165 are valid. The second field 175 then stores the earlier discussed branch direction confidence. Accordingly, when the analysis circuitry 70 detects the presence of the trigger condition, and accordingly wishes to start maintaining a branch direction confidence for the dependent branch instruction, it can allocate an entry 165 within the additional storage 160, and then store in the index field 170 an indication of the entry 155 in the value prediction storage 150 with which the entry 165 is associated. It will be appreciated that such an approach enables the same information to be maintained as in the example implementation shown in FIG. 3, but can potentially lead to a more efficient utilisation of overall storage capacity, by avoiding the need to provide the additional fields 135, 140 in association with every entry 105 in the value prediction storage.

Figure 5:
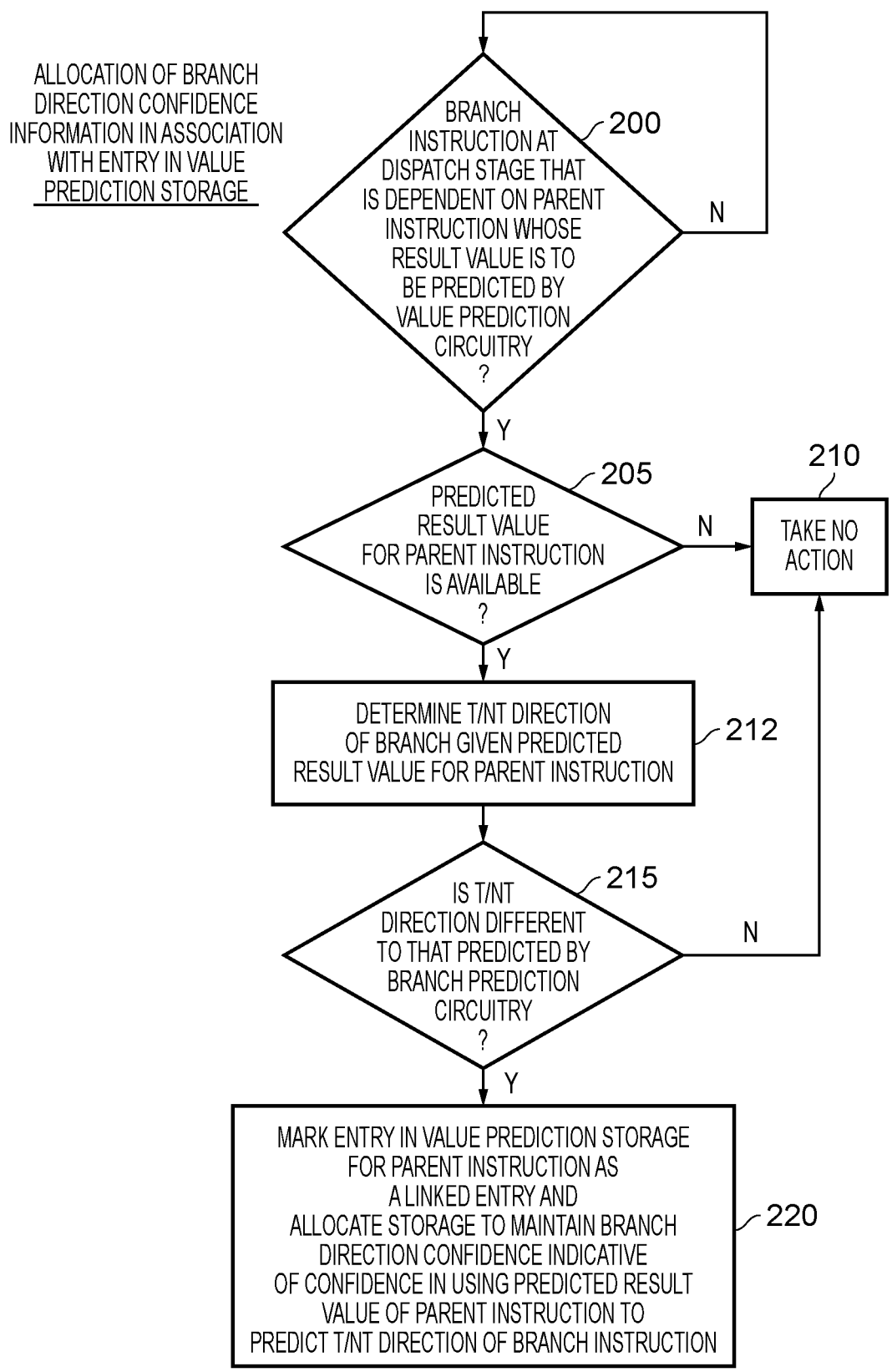
FIG. 5 is a flow diagram illustrating the process performed in order to allocate branch direction confidence information in association with an entry in the value prediction storage, in accordance with one example implementation.

FIG. 5 is a flow diagram illustrating the steps taken in order to allocate branch direction confidence information in association with an entry in the value prediction storage, using either the mechanism of FIG. 3 or the mechanism of FIGS. 4A and 4B. At step 200, the analysis circuitry 70 is used to detect when there is a branch instruction at the dispatch stage (i.e. within the record of pending instructions 50) that is dependent on a given instruction whose result value is to be predicted by the value prediction circuitry 60. For the purposes of the following discussion, such a given instruction will be referred to as a parent instruction, and the branch instruction will be referred to as a dependent instruction of that parent instruction.

When the presence of such a dependent branch instruction is detected at step 200, then at step 205 the analysis circuitry checks whether the predicted result value for the parent instruction is available from the value prediction circuitry 60. For example, it may be the case that an entry has been allocated within the value prediction storage for the parent instruction, but the predicted result value field has not yet been populated, for example because that instruction is still in the process of being executed by the execute units. Further, even if the predicted result value field is populated, it may be the case that the result value confidence provided in association with that particular result value is not yet at a threshold level where the dispatch circuitry will start to take the predicted result value into account when deciding which instructions to dispatch. In either of these cases, it may be decided at step 205 that the predicted result value is not yet available, and if that is the case the process will proceed to step 210 where no action will be taken in respect of the branch instruction detected at step 200.

However, if the predicted result value for the parent instruction is available, then the process proceeds to step 212 where a branch direction prediction is made for the branch instruction given the predicted result value for the parent instruction. This is the additional branch direction prediction referred to earlier. As will be apparent from the earlier discussed FIG. 2, the analysis circuitry 70 can determine this additional branch direction prediction by using the predicted result value to determine whether the branch will be taken or not taken, assuming that predicted result value is correct.

At step 215, it is then determined whether the additional branch direction prediction determined at step 212 differs to the initial branch direction prediction predicted by the branch prediction circuitry 55. As discussed earlier, this initial branch direction prediction information will be passed through the pipeline in association with the branch instruction, and hence available to the analysis circuitry 70 in order to make the determination at step 215. If the additional branch direction prediction is the same as the initial branch direction prediction, then the process proceeds to step 210, and no further action is taken. However, if at step 215 it is determined that the additional branch direction prediction differs to the initial branch direction prediction, then the process proceeds to step 220 where the entry in the value prediction storage for the parent instruction is marked as a linked entry, and storage is allocated to maintain branch direction confidence information indicative of the confidence in using the predicted result value of the parent instruction to predict the branch direction of the branch instruction. As will be apparent from the earlier discussed FIGS. 3, 4A and 4B, the entry in the value prediction storage could be marked as a linked entry in a variety of ways. For example, in the consolidated single storage approach, the field 135 can be set to mark the entry in the value prediction storage as a linked entry. However, in the approach of FIGS. 4A and 4B, the entry 155 can instead be marked as linked by populating the index information in the field 170 of an entry 165 of the additional storage 160, to identify the entry 155 in the value prediction storage.

It may be that at the initial time of allocation of the branch direction confidence information at step 220, the branch direction confidence information is merely initialised to an initial value. Typically, that initial value will be such that it does not meet the threshold requirements necessary for the analysis circuitry to start detecting mispredictions in respect of the initial branch direction made by the branch prediction circuitry, and instead the branch direction confidence is updated each time the branch instruction is subsequently executed, based on feedback signals from the execute units 40. This process is shown in FIG. 6.

In particular, at step 250 it is determined whether the branch direction is available from the execute units for a current instance of execution of the relevant branch instruction. When that is the case, it is determined at step 255 whether the branch direction determined using the predicted result value for the parent instruction is correct or not, i.e. whether that prediction matches the actual branch direction outcome indicated by the execute units. If so, then the branch direction confidence is incremented at step 260 unless the confidence is already at a maximum value. Conversely, if the actual branch outcome differs to the branch direction prediction made using the predicted result value for the parent instruction, then the process proceeds to step 265 where the branch direction confidence is decremented unless the confidence is already at a minimum value. The process then returns to step 250.

Figure 6:
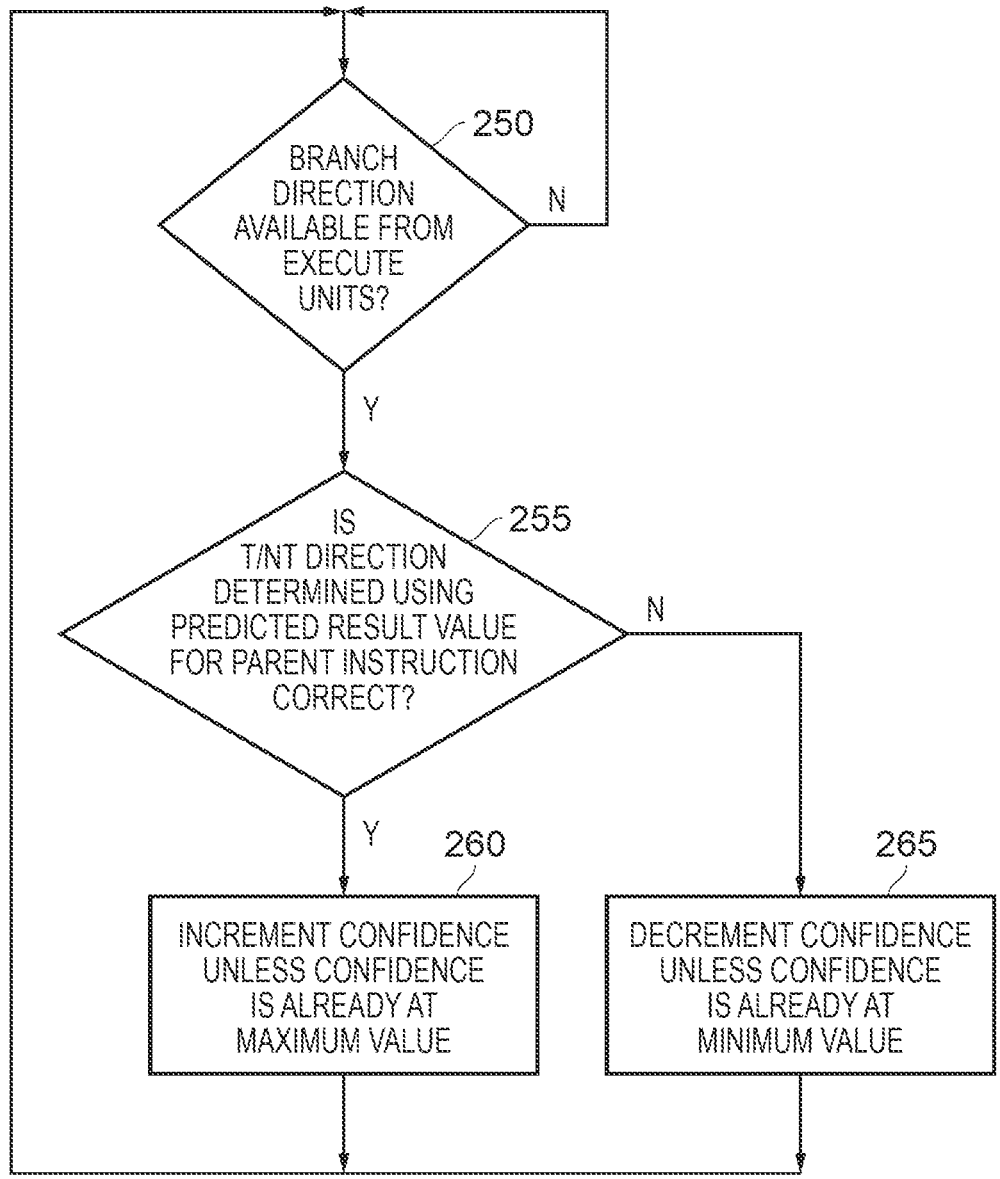
FIG. 6 is a flow diagram illustrating the steps which may be performed in order to update branch direction confidence information once allocated in association with an entry in the value prediction storage, in accordance with one example implementation.

It will be appreciated that FIG. 6 merely shows one specific way in which the branch direction confidence can be maintained. It will be appreciated that alternative implementations could be used. For example, it may be decided not to decrement the branch direction confidence when the branch direction prediction differs to the actual outcome, but merely to increment the confidence when the branch prediction matches the outcome. As another alternative, it may be that the increment amount is not the same as the decrement amount. Further, it will be appreciated that whilst in FIG. 6 it is assumed that the confidence has to increase beyond a threshold amount before the analysis circuitry starts taking action in dependence on the additional branch direction prediction, it could alternatively be the case that an increased confidence is indicated by a lower value. In such a case, the initial value may be set to a chosen positive value, and the confidence value may be decreased each time the predicted branch direction matches the actual branch direction, and incremented each time the predicted branch direction does not match the actual branch direction. The threshold value may then be a chosen value lower than the initial value, for example 0.

Figure 7:
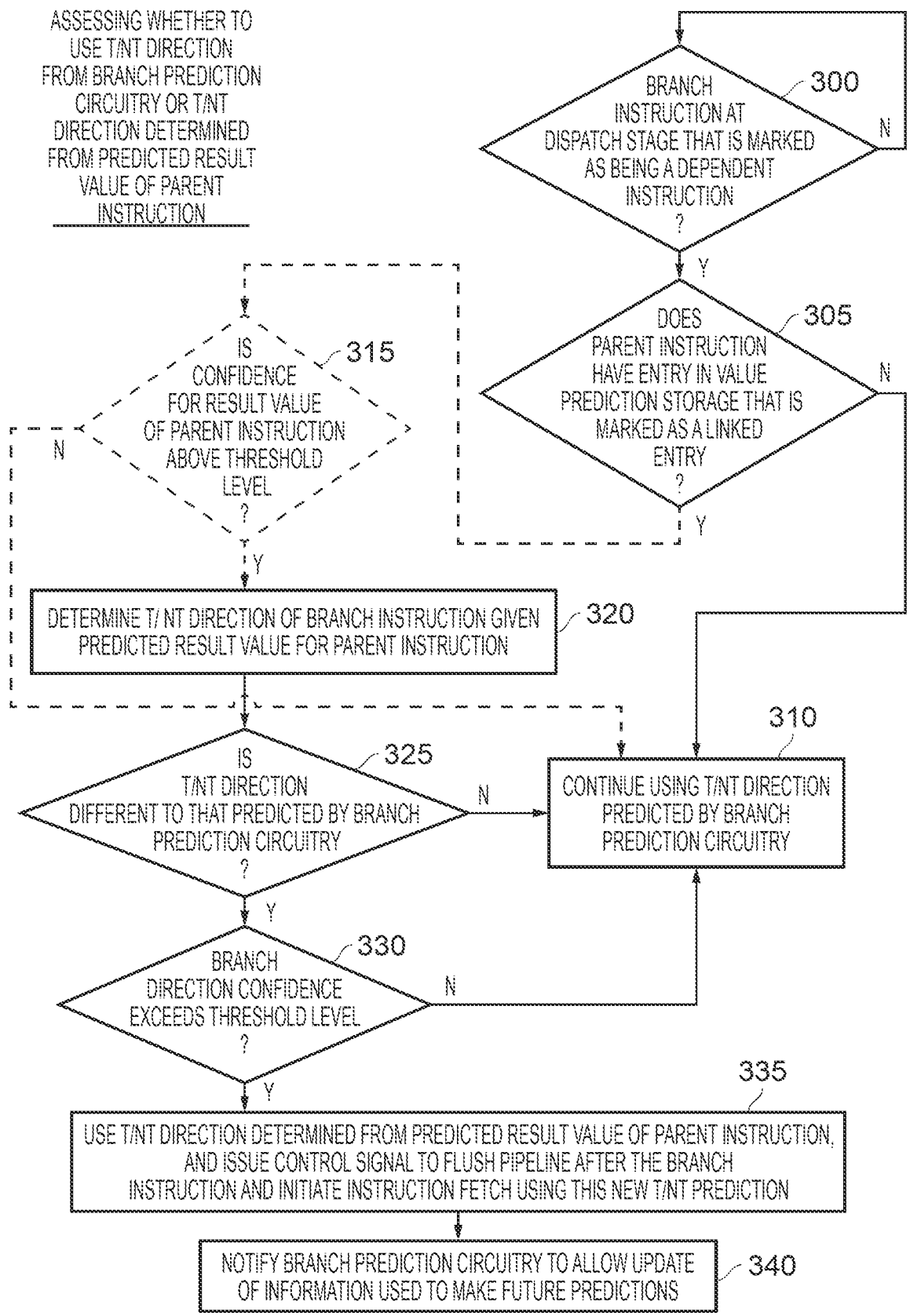
FIG. 7 is a flow diagram illustrating steps performed in order to determine whether to use the branch direction prediction from branch prediction circuitry or the branch direction prediction determined from a predicted result value of a parent instruction, in accordance with one example implementation.

FIG. 7 is a flow diagram illustrating steps taken by the analysis circuitry 70 in order to assess whether to use the additional branch direction prediction determined using the predicted result value of the parent instruction, or the initial branch direction prediction provided by the branch prediction circuitry. At step 300 it is determined whether there is a branch instruction at the dispatch stage 30 that is marked as being a dependent instruction. The instructions can be marked in a variety of ways, but in one example a piece of metadata may be passed through the pipeline in association with each instruction to identify whether it is a dependent instruction.

When it is detected that there is a dependent branch instruction at the dispatch stage, then at step 305 it is determined whether the parent instruction for that dependent branch instruction has an entry in the value prediction storage that is marked as a linked entry. If there is an entry for the parent instruction, then with regards to the example of FIG. 3, this can be determined by analysis of the field 135 for that entry, whereas in the example of FIG. 4B this can be determined by analysis of the fields 170 in order to identify whether the entry 155 for the parent instruction is identified in the field 170 of one of the entries 165 of the extra storage 160.

If it is determined at step 305 that the parent instruction does have an entry in the value prediction storage that is marked as a linked entry, then in one example implementation the process may proceed directly to step 320 where the additional branch direction prediction is made by the analysis circuitry using the predicted result value for the parent instruction. The process then proceeds to step 325 where it is determined whether that additional branch direction prediction is different to the initial branch direction prediction made by the branch prediction circuitry. If not, then at step 310 it is determined to continue using the initial branch direction prediction made by the branch prediction circuitry 55. The process also proceeds directly to step 310 from step 305 if it is determined that the parent instruction does not have an entry in the value prediction storage that is marked as a linked entry.

If at step 325 it is determined that the additional branch direction prediction is different to the initial branch direction prediction, it is then determined at step 330 whether the branch direction confidence exceeds a chosen threshold level. It will be appreciated that the threshold level can be set as required, dependent on implementation. If the branch direction confidence does not exceed the threshold level, then the process again proceeds to step 310, where the apparatus continues to use the initial branch direction prediction provided by the branch prediction circuitry 55.

However, if at step 330 it is determined that the branch direction confidence does exceed the threshold level, then at step 335 it is decided to use the additional branch direction prediction determined from the predicted result value, and as a result the analysis circuitry 70 issues a control signal to the fetch circuitry in order to flush the pipeline after the branch instruction, and thereafter cause the fetch circuitry to initiate instruction fetching using the new branch direction prediction (i.e. the opposite direction to the direction initially predicted by the branch prediction circuitry 55). As shown by step 340, if desired the branch prediction circuitry can also be notified via the control signal from the analysis circuitry, in order to allow an update of the information used by the branch prediction circuitry to make future predictions in respect of the branch instruction.

As shown by the dotted box 315 in FIG. 7, in an alternative implementation, rather than proceeding directly from step 305 to step 320 in the event that it is determined that the parent instruction has an entry in the value prediction storage that is marked as a linked entry, an additional check can be performed first. In particular, at step 315 it can be determined whether the confidence for the result value of the parent instruction is above a chosen threshold level. In particular, it may be considered that it is not appropriate to make any use of the additional branch direction prediction unless the confidence in the predicted result value is above that threshold. Hence, if the confidence for the result value of the parent instruction is above the threshold, then the process can proceed to step 320 to continue the process as discussed earlier, but if the confidence in the result value is not above that threshold, the process can instead proceed to step 310 where the apparatus continues to use the initial branch direction prediction provided by the branch prediction circuitry 55.

Figure 8:
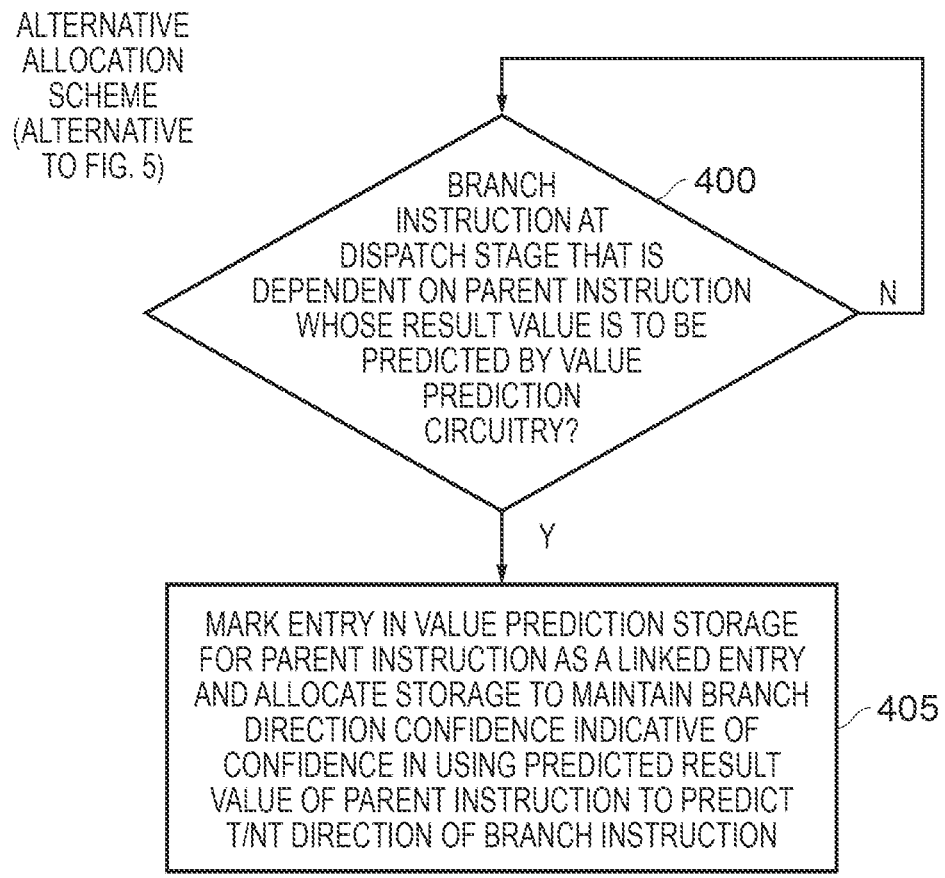
FIG. 8 is a flow diagram illustrating an alternative allocation scheme to that illustrated in FIG. 5.

From the earlier discussed example of FIG. 5, it will be appreciated that the allocation scheme described therein is such that the analysis circuitry only starts to maintain branch direction confidence information for the dependent branch instruction once it has been determined that the predicted result value for the parent instruction is available, for example because the confidence in the predicted result value exceeds the result value confidence threshold level, and it is determined that the additional branch direction prediction made using the predicted result value differs to the initial branch direction prediction made by the branch prediction circuitry. However, in an alternative implementation the trigger condition that causes the branch direction confidence information to start to be maintained may not require these conditions to be present. FIG. 8 is a flow diagram illustrating an alternative allocation scheme to that used in FIG. 5.

In accordance with the alternative allocation scheme, it is determined at step 400 whether a branch instruction at the dispatch stage is dependent on a parent instruction whose result value is to be predicted by the value prediction circuitry. Whenever that is the case, then the process immediately proceeds to step 405 where the entry in the value prediction storage for the parent instruction is marked as a linked entry, and storage is then allocated to maintain branch direction confidence information indicative of the confidence in using the predicted result value of the parent instruction to predict the branch direction of the branch instruction. Hence, in this case, even if a required degree of confidence in the predicted result value has not yet been achieved, and even if the additional branch direction prediction determined using that predicted result value does not differ from the initial branch direction prediction made by the branch prediction circuitry, the analysis circuitry may still allocate resources to start tracking the branch direction confidence information.

Figure 9:
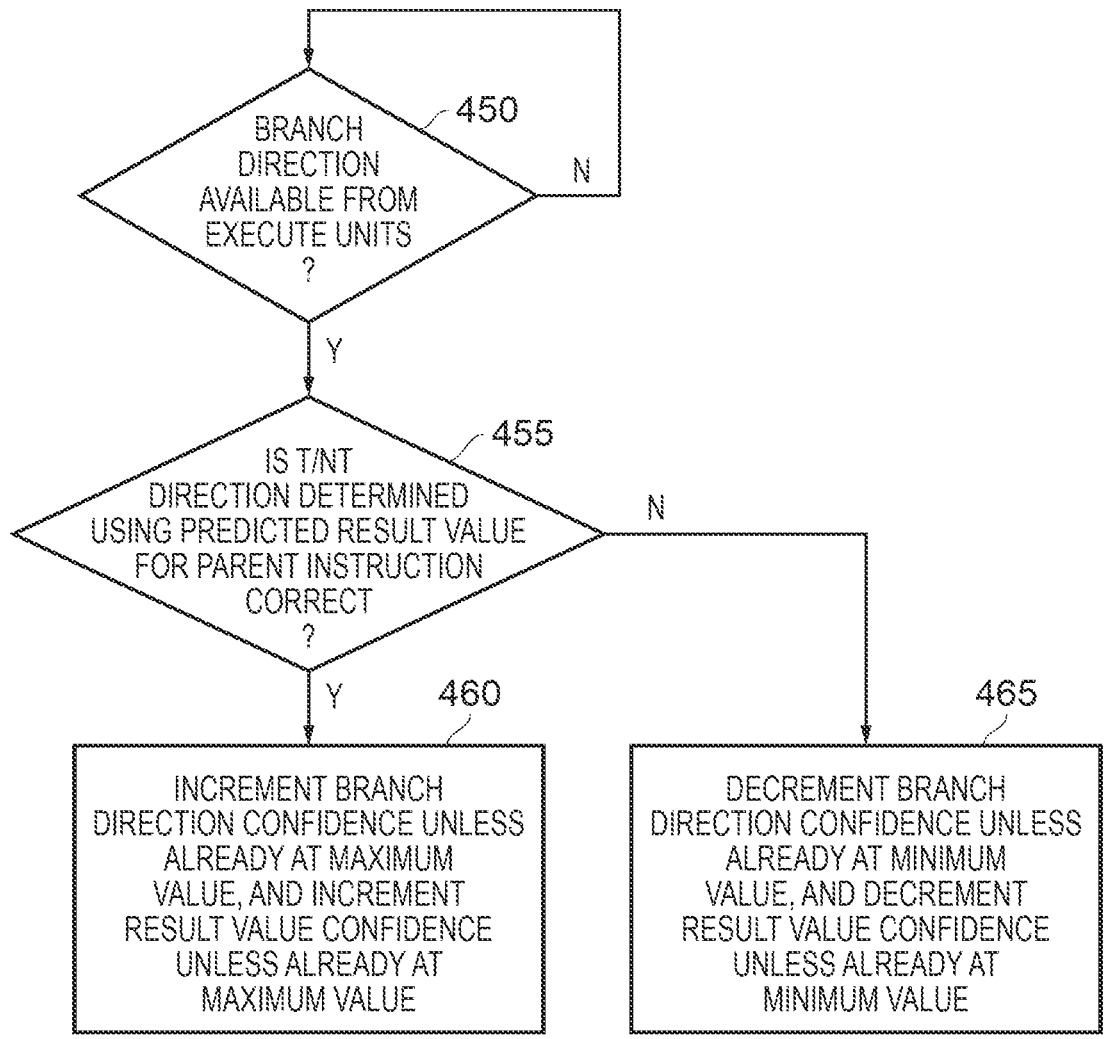
FIG. 9 is a flow diagram illustrating steps performed in order to update the branch direction confidence when using the allocation scheme of FIG. 8, in accordance with one example implementation.

FIG. 9 is a flow diagram illustrating how the branch direction confidence information may be updated when using the alternative allocation scheme of FIG. 8. At step 450, it is determined, for a current instance of the branch instruction, whether the branch direction is available from the execute units 40, i.e. whether the actual branch outcome is known. When this is the case, it is then determined at step 455 whether the additional branch direction prediction determined using the predicted result value for the parent instruction is correct or not. If so, then at step 460 not only is the branch direction confidence incremented unless it is already at a maximum value, but in additional the result value confidence is also incremented unless that is already at a maximum value. Similarly, if the additional branch direction prediction is not correct, the process proceeds to step 465 where, not only is the branch direction confidence decremented unless it is already at a minimum value, but also the result value confidence is decremented unless it is already at a minimum value.

The process employed to assess whether to use the additional branch direction prediction determined using the predicted result value, or the initial branch direction prediction provided by the branch prediction circuitry 55, can be the same as discussed earlier for the first example implementation, i.e. the process of FIG. 7 can still be employed.

When using the approach of FIG. 9, it can be seen that in situations where the initial branch direction prediction made by the branch prediction circuitry becomes consistently more accurate than the additional branch direction prediction, this can be used to reduce the confidence in the predicted result value. This may ultimately cause the entry for the predicted result value to be flushed from the value prediction storage, or for the predicted result value to instead be determined based on the initial branch direction prediction made by the branch prediction circuitry. In particular, based on that initial branch direction prediction, it may be possible to assess accurately what the predicted result value for the parent instruction should be. Merely by way of explicit example, referring back to the earlier example of FIG. 2, if the branch prediction circuitry accurately predicts that the branch instruction BEQ will be taken, this means that the predicted result value for instruction A should be the value Y, since it is known that the comparison operation identifies that the result value is equal to Y. Hence, it can be seen that in this instance the accuracy of the predicted result value stored in the value prediction storage can be increased.

From the above described example implementations, it will be appreciated that the techniques described herein can enable an early detection of situations where the branch direction prediction made by branch prediction circuitry 55 is likely to be wrong, allowing an early flush of the pipeline prior to the branch instruction actually being executed by the processing circuitry. This can significantly improve performance. Further, due to the interplay between the value prediction storage 65 and the branch prediction circuitry 55 using the techniques described herein, this can enable the accuracy of the branch prediction circuitry, or indeed the accuracy of the predicted result value maintained in the value prediction storage for the parent instruction of the branch instruction, to be increased, thereby again yielding improvements in performance within the system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions;
fetch circuitry to fetch the instructions for execution by the processing circuitry, the fetch circuitry being arranged, when encountering a branch instruction, to determine subsequent instructions to be fetched in dependence on an initial branch direction prediction for the branch instruction made by branch prediction circuitry;
value prediction circuitry to maintain a predicted result value for one or more instructions;
dispatch circuitry to maintain a record of pending instructions that have been fetched by the fetch circuitry and are awaiting execution by the processing circuitry, and to select pending instructions from the record for dispatch to the processing circuitry;
wherein when a given instruction whose predicted result value is maintained by the value prediction circuitry has a dependent instruction whose outcome is dependent on a result value of the given instruction, and the dependent instruction is in the record of pending instructions, the dispatch circuitry is arranged to enable speculative execution of the dependent instruction by the processing circuitry using the predicted result value of the given instruction; and
analysis circuitry arranged, when the dependent instruction is the branch instruction, to detect a mispredict condition when an additional branch direction prediction for the branch instruction determined using the predicted result value for the given instruction is considered more accurate than the initial branch direction prediction, and the additional branch direction prediction differs to the initial branch direction prediction, and on detection of the mispredict condition to issue a control signal to indicate that the branch instruction has been mispredicted.

2. An apparatus as claimed in claim 1, wherein, in response to the control signal, the instructions that have been fetched by the fetch circuitry based on the initial branch direction prediction are flushed from the apparatus and the fetch circuitry is arranged to begin fetching subsequent instructions based on the additional branch direction prediction.

3. An apparatus as claimed in claim 1, wherein:
the analysis circuitry is arranged, in response to a trigger condition, to maintain, in association with an entry in value prediction storage of the value prediction circuitry used to maintain the predicted result value for the given instruction, a branch direction confidence indicating a confidence in the additional branch direction prediction; and
the analysis circuitry is arranged to monitor an execution outcome of execution of the branch instruction by the processing circuitry and to update the branch direction confidence dependent on the execution outcome.

4. An apparatus as claimed in claim 3, wherein when the execution outcome of execution of the branch instruction indicates a branch direction that matches the additional branch direction prediction, the analysis circuitry is arranged to adjust the branch direction confidence to indicate an increased confidence.

5. An apparatus as claimed in claim 4, wherein when the execution outcome of execution of the branch instruction indicates a branch direction that differs from the additional branch direction prediction, the analysis circuitry is arranged to adjust the branch direction confidence to indicate a decreased confidence.

6. An apparatus as claimed in claim 5, wherein when the execution outcome of execution of the branch instruction indicates a branch direction that differs from the additional branch direction prediction, the analysis circuitry is further arranged to adjust a confidence in the predicted result value to indicate a decreased confidence in the predicted result value.

7. An apparatus as claimed in claim 4, wherein when the execution outcome of execution of the branch instruction indicates a branch direction that matches the additional branch direction prediction, the analysis circuitry is further arranged to adjust a confidence in the predicted result value to indicate an increased confidence in the predicted result value.

8. An apparatus as claimed in claim 3, wherein the analysis circuitry is arranged to monitor the execution outcome of execution of the branch instruction for multiple instances of execution of the branch instruction, and to update the branch direction confidence dependent on each execution outcome.

9. An apparatus as claimed in claim 3, wherein the analysis circuitry is arranged, for a current instance of execution of the branch instruction, to detect the mispredict condition when the additional branch direction prediction differs to the initial branch direction prediction and the branch direction confidence exceeds a branch direction confidence threshold value.

10. An apparatus as claimed in claim 3, wherein presence of the trigger condition requires at least detection that the additional branch direction prediction differs from the initial branch direction prediction.

11. An apparatus as claimed in claim 10, wherein presence of the trigger condition further requires a confidence in the predicted result value to exceed a result value confidence threshold value.

12. An apparatus as claimed in claim 3, wherein the trigger condition is determined to be present when the branch instruction is detected as a pending instruction in the record, and the value prediction circuitry has the entry for the given instruction.

13. An apparatus as claimed in claim 3, wherein the branch direction confidence is maintained within a field of the entry in the value prediction storage used to maintain the predicted result value for the given instruction.

14. An apparatus as claimed in claim 3, wherein the branch direction confidence is maintained within an additional storage structure separate to the value prediction storage within the value prediction circuitry used to maintain the predicted result value for the given instruction, and an entry in the additional storage structure used to maintain the branch direction confidence is arranged to include an indication of the entry in the value prediction storage used to maintain the predicted result value for the given instruction.

15. An apparatus as claimed in claim 1, wherein the analysis circuitry is provided in association with the dispatch circuitry.

16. An apparatus as claimed in claim 1, wherein the control signal is also provided to the branch prediction circuitry to enable adjustment of information used by the branch prediction circuitry to make the initial branch direction prediction for subsequent instances of the branch instruction.

17. An apparatus as claimed in claim 1, wherein detection of the mispredict condition further requires a confidence in the predicted result value to exceed a result value confidence threshold value.

18. A method of performing branch prediction comprising:
employing processing circuitry to execute instructions;
fetching the instructions for execution by the processing circuitry, and when encountering a branch instruction during the fetching, determining subsequent instructions to be fetched in dependence on an initial branch direction prediction for the branch instruction made by branch prediction circuitry;
employing value prediction circuitry to maintain a predicted result value for one or more instructions;
maintaining a record of pending instructions that have been fetched and are awaiting execution by the processing circuitry, and selecting pending instructions from the record for dispatch to the processing circuitry;
when a given instruction whose predicted result value is maintained by the value prediction circuitry has a dependent instruction whose outcome is dependent on a result value of the given instruction, and the dependent instruction is in the record of pending instructions, enabling speculative execution of the dependent instruction by the processing circuitry using the predicted result value of the given instruction;
when the dependent instruction is the branch instruction, detecting a mispredict condition when an additional branch direction prediction for the branch instruction determined using the predicted result value for the given instruction is considered more accurate than the initial branch direction prediction, and the additional branch direction prediction differs to the initial branch direction prediction; and
on detection of the mispredict condition, issuing a control signal to indicate that the branch instruction has been mispredicted.

19. An apparatus comprising:
processing means for executing instructions;
fetch means for fetching the instructions for execution by the processing means, the fetch means, when encountering a branch instruction, for determining subsequent instructions to be fetched in dependence on an initial branch direction prediction for the branch instruction made by branch prediction means;
value prediction means for maintaining a predicted result value for one or more instructions;
dispatch means for maintaining a record of pending instructions that have been fetched by the fetch means and are awaiting execution by the processing means, and for selecting pending instructions from the record for dispatch to the processing means;
wherein when a given instruction whose predicted result value is maintained by the value prediction means has a dependent instruction whose outcome is dependent on a result value of the given instruction, and the dependent instruction is in the record of pending instructions, the dispatch means is arranged to enable speculative execution of the dependent instruction by the processing means using the predicted result value of the given instruction; and
analysis means for detecting, when the dependent instruction is the branch instruction, a mispredict condition when an additional branch direction prediction for the branch instruction determined using the predicted result value for the given instruction is considered more accurate than the initial branch direction prediction, and the additional branch direction prediction differs to the initial branch direction prediction, and on detection of the mispredict condition for issuing a control signal to indicate that the branch instruction has been mispredicted.

* * * * *